L. D. KROFF.
MILK CAN ATTACHMENT.
APPLICATION FILED OCT. 8, 1921.
1,436,988.
Patented Nov. 28, 1922.
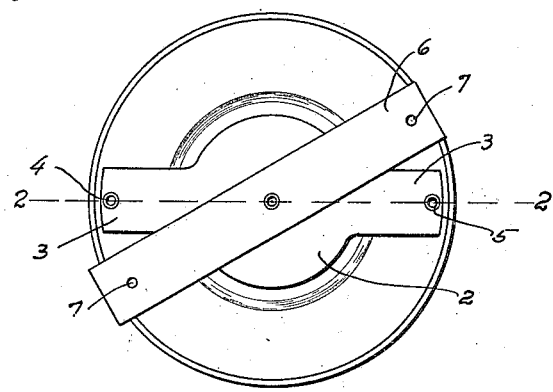
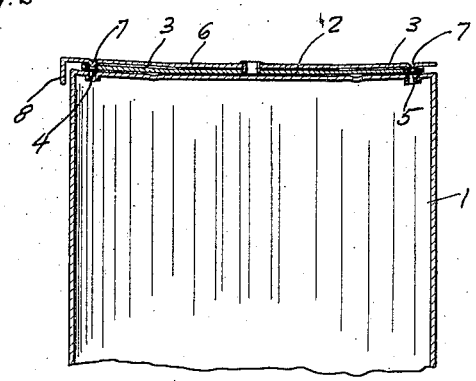
INVENTOR.
Leonard D. Kroff,
BY Walter N. Haskell,
his ATTORNEYS.

Patented Nov. 28, 1922.

1,436,988

UNITED STATES PATENT OFFICE.

LEONARD D. KROFF, OF STERLING, ILLINOIS.

MILK-CAN ATTACHMENT.

Application filed October 8, 1921. Serial No. 506,262.

*To all whom it may concern:*

Be it known that I, LEONARD D. KROFF, a citizen of the United States, residing at Sterling, in the county of Whiteside and State of Illinois, have invented certain new and useful Improvements in a Milk-Can Attachment, of which the following is a specification.

My invention relates to attachments for milk cans, of that kind which are used in the production and sale of condensed milk and cream. The purpose thereof is to provide a closure for the can, for use when the contents of the can have been partially removed. It is of a simple and inexpensive construction, and is designed to be attached to the can at the factory, and discarded with the can after the contents have been used.

In the drawings:

Fig. 1 represents the top of a milk can, with the invention in place thereon.

Fig. 2 is a section of the upper part of the can, on the broken line 2—2 of Fig. 1, the part 6 being shown in line with the arms 3.

The reference numeral 1 indicates a can of usual construction, and 2 a disk of cardboard or similar material, provided with radial extensions 3, provided near their ends with eyelet openings 4 and 5. Pivoted at a central point to the disk 2 is a plate 6, near the ends of which are indentations 7, formed by forcing a part of the plate downwardly. When the plate 6 is in position above the arms 3 the indentations coincide in position with the openings 4 and 5.

The inner face of the disk 2 is provided with an adhesive, by means of which it can be secured in place on the end of the can. When it is desired to use the contents of the can, openings are made in the top thereof by means of a sharp instrument driven through the openings 4 and 5 into the can. One of such openings is used for the discharge of the milk, while the other serves as an air vent. When a portion of the milk has been withdrawn from the can the plate 6 is turned into position above the arms 3, the indentations 7 projecting into the openings 4 and 5, so as to perfectly close the same, and prevent a film of milk from forming in same, which is likely to happen when the openings are not closed. To facilitate the operation of the plate 6 it is provided at one of its ends with an angular extension 8, forming a handle therefor.

The inner face of the disk 2 can be supplied with a coating of adhesive, in a dry state, which, upon being moistened, will permit the disk to be attached to the can. They can thus be prepared in quantities, and applied to the cans at the factory or point of sale. They are not limited to this use, however, but can be furnished to the user of the can, to be attached before the same is opened.

What I claim as my invention, and desire to secure by Letters Patent, is:

1. A device of the class described, comprising a member adapted for attachment to the end of a can, provided with a lateral extension having an opening near the end thereof, and a plate pivoted to said member and provided with an indentation capable of coinciding in position with said opening when said plate and extension are in alignment.

2. A device of the class described, comprising a disk adapted for attachment to the end of a milk-can, and provided with a pair of radial extensions provided near their ends with eyelet openings; and a plate pivoted to said disk and provided in its lower face with projections adapted to enter said openings when said plate and extensions are in alignment.

3. A device of the class described, comprising a disk member provided with an adhesive on one of its faces, and having a pair of oppositely disposed radial arms fitted near their ends with eyelet openings; and a plate pivotally mounted on that face of the disk opposite to the adhesive, and provided at its ends with indentations adapted to enter said openings when the plate and arms are in alignment.

In testimony whereof I affix my signature.

LEONARD D. KROFF.